June 5, 1951     H. D. COMINS     2,555,633

STRESS-STRAIN RECORDER

Filed Aug. 27, 1945     3 Sheets-Sheet 1

INVENTOR.
Harrison D. Comins
BY
Bruno C. Lechler
ATTORNEY.

June 5, 1951  H. D. COMINS  2,555,633
STRESS-STRAIN RECORDER
Filed Aug. 27, 1945  3 Sheets-Sheet 2
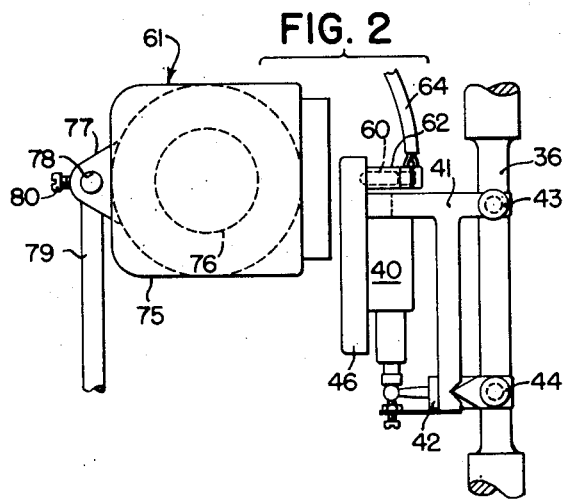
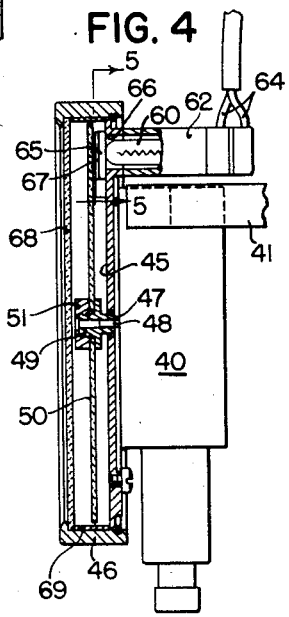
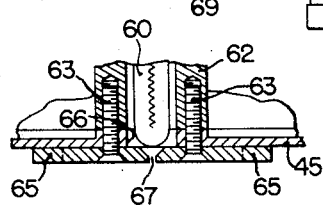
INVENTOR.
Harrison D. Comins
BY Bruno C. Lechler
ATTORNEY.

June 5, 1951 H. D. COMINS 2,555,633
STRESS-STRAIN RECORDER
Filed Aug. 27, 1945 3 Sheets-Sheet 3

INVENTOR.
BY Harrison D. Comins
Bruno C. Lechler
ATTORNEY.

Patented June 5, 1951

2,555,633

UNITED STATES PATENT OFFICE 2,555,633

STRESS-STRAIN RECORDER

Harrison D. Comins, Davenport, Iowa, assignor to American Machine and Metals, Inc., New York, N. Y., a corporation of Delaware Application August 27, 1945, Serial No. 612,874

15 Claims. (Cl. 73—89)

The present invention relates generally to materials testing apparatus and more particularly to testing machines for determining the stress-strain characteristics of materials, and has for its principal object the provision of novel and improved mechanism for indicating and recording the elongation of a test specimen under stress.

During the testing of very high strength materials, such as steel, the elongation of a specimen is very small before the elastic limit is reached, and requires sensitive apparatus to obtain an accurate measurement. This is generally accomplished by the conventional extensometer, which clamps to the test specimen at two points spaced apart at a predetermined distance, and operates through an extremely high magnification ratio to indicate on a dial the amount of elongation. While it is common practice for the operator to read and manually record simultaneous values of force applied to the specimen and elongation of the latter between the test points, this method is subject to human error. An object of this invention, therefore, relates to the provision of means for automatically recording simultaneous values of force and elongation.

Because of the great magnification ratio in the conventional extensometer, it is impracticable to connect the mechanism of the latter directly to a recording device for moving either the chart or the pen, for the inaccuracy of such an arrangement would be excessive. Although intricate motor driven follow-up mechanisms have been devised, they are highly complex and expensive. Hence, a further object of the present invention contemplates the provision of means for detecting and transmitting the movement of the indicator of an extensometer to a recording device, said means being comparatively simple and inexpensive but accurate and without imposing friction load on the extensometer mechanism.

More broadly, another object has to do with transmitting indications of a dial type of instrument, with particular reference to indications which change unidirectionally, in other words, those which continuously increase or continuously decrease in value, but not necessarily at a constant rate of change. The extensometer is an example of the continuously increasing indication.

In the accomplishment of these objects an instrument is provided which emits a flash of light for each predetermined increment of change of the dial indication. In the preferred embodiment the conventional indicator hand is replaced by a disk having a series of alternate opaque and transparent segmental portions spaced peripherally around the disk. A light is placed behind the disk with a slotted partition therebetween. As the indication of the instrument changes, the opaque and transparent segments move alternately into register with the slot, thereby alternately interrupting and transmitting the beam of light from the slot. A photo-electric device positioned in front of the instrument converts the light impulses to electrical impulses, which are transmitted to the recorder for actuating a solenoid operated ratchet device for moving the recorder drum. The pen of the recorder is moved axially of the drum responsive to the amount of force exerted on the specimen.

When the yield point of the specimen is reached, the elongation proceeds at a much greater rate to the ultimate load limit, making it desirable to change to a low magnification ratio on the recorder. A further object of the invention, therefore, relates to the provision of means for quickly changing from high to low ratio and vice versa.

At times it is desirable to operate the recorder manually without recourse to the photo-electric device. Hence another object relates to the provision of manually operable means for actuating the recorder drum.

These and other objects and advantages of the present invention will be apparent to those skilled in the art after a consideration of the following description, in which reference is had to the drawings appended hereto, in which Figure 1 is an elevational view partly in section of a testing machine with a recorder embodying the principles of the present invention.

Figure 2 is an enlarged side elevational view of the test specimen with extensometer attached and the photo-electric unit positioned in front of the extensometer dial in operating position.

Figure 3 is a front elevational view of part of the extensometer, drawn to a larger scale.

Figure 4 is a further enlarged, side elevational view of the extensometer, the indicator dial being shown in section.

Figure 5 is a fragmentary front elevational sectional view taken along a line 5—5 in Figure 4, showing the light and slotted mask therefor, and drawn to a still larger scale.

Figure 6 is a fragmentary top plan view taken in section along a line 6—6 in Figure 5.

Figure 11 is a schematic wiring diagram of the electrical circuits.

Figure 1:
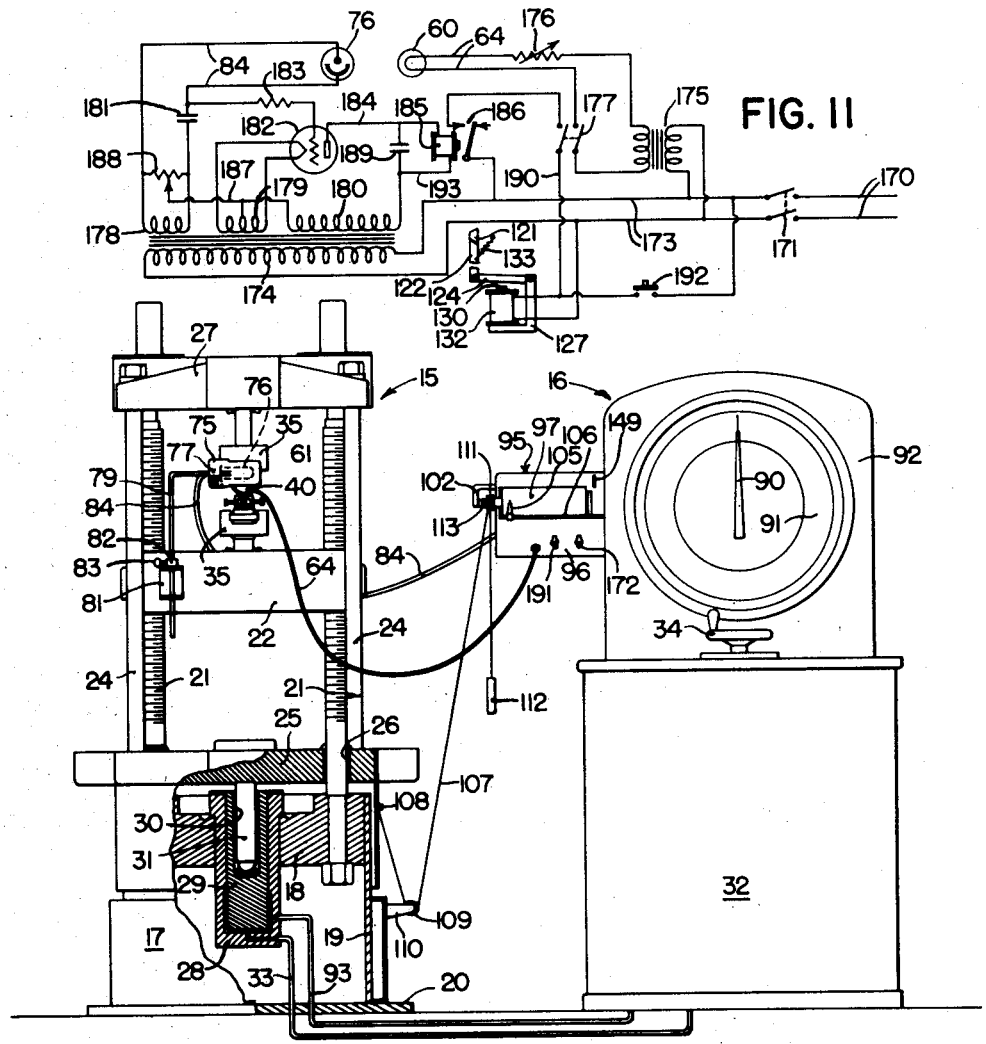

Referring now to the drawings, and more particularly to Figure 1, the testing machine comprises a loading unit 15 and an indicating and pumping unit 16, which contains the mechanism for driving the loading unit and also indicates and records the test results.

The loading unit 15 comprises a rigid base 17 including a stationary table 18 supported on a vertical wall 19 standing on a floor plate 20. A pair of vertical screw colums 21 are rigidly mounted on the table 18 and carry a lower head 22, which extends horizontally between the columns 21 and is also normally stationary, but can be adjusted vertically on the screw columns for different sizes and shapes of test specimens. The adjusting mechanism is conventional and does not form an essential part of the present invention.

The vertically movable part of the leading unit comprises a table 25 disposed above the stationary table 18 and has openings 26, through which the screw columns 21 extend. An upper head 27 is mounted rigidly on four corner posts 24 on the table 25 and moves vertically with the latter relative to the lower head 22 and has openings (not shown) for receiving the upper ends of the screw columns therethrough.

The table 25 and upper head 27 are raised by means of a hydraulic cylinder 28, within which is slidably disposed a piston 29. The cylinder 28 is rigidly mounted on the stationary table 18 and the piston has a recess 30 in which a push rod 31 is supported, the latter being connected to the table 25. Hydraulic fluid is supplied to the cylinder 28 under pressure by suitable conventional pumping means (not shown) disposed within the lower housing 32 of the pumping unit 16, through a supply duct 33. The rate of flow of the fluid is regulated by a controller 34 and the fluid flows into the cylinder 28, thereby raising the piston 29, together with the table 25 and upper head 27.

The upper and lower heads 27, 22, are each provided with suitable grips 35, between which the test specimen is securely held for tests under tension. The test specimen is conventional and is indicated at 36 in Figure 2. The elongation of the specimen is measured during the test by an extensometer 40 having a pair of yokes 41, 42, secured to the specimen 36 by knurled headed set screws 43, 44, respectively, the latter engaging the specimen 36 at points spaced at a predetermined distance apart before the specimen is stressed. Inasmuch as the details of the extensometer mechanism and supports are conventional, no detailed description is deemed necessary here.

Coming now to that part of the assembly with which the present invention is more directly concerned, the extensometer 40 is provided with a stationary graduated dial 45, contained within a dial case 46 attached to the case of the extensometer. The dial 45 is centrally apertured at 47 to receive the indicator shaft 48, on which is supported an externally threaded hub 49, in place of the indicator hand usually provided. According to the invention, the hand is replaced by a circular disk 50 mounted on the hub 49 and secured rigidly thereto by a cap nut 51. The disk 50 is made of transparent plastic material and an indicator hand 52 is printed or painted on the disk. An annular opaque band 53 is printed or painted around the outer periphery of the disk 50, the band having a series of radially extending, peripherally spaced transparent segments 54, although slots in the disk would also serve the purpose.

This band 53 acts as a screen or partition between a light 60 and a photo-electric device 61. The light 60 is a miniature electric lamp mounted within a casing 62 secured to the back of the extensometer dial 45 at the top of the latter, by means of a pair of screws 63. The lamp 60 obtains electric energy from a pair of supply wires 64. The light source is masked by a pair of plates 65 disposed between the lamp 60 and screen 53 and secured in front of the dial 45 by the screws 63. The dial 45 is apertured at 66 in register with the lamp 60 and the plates 65 are spaced apart to provide a vertical slot 67 therebetween having dimensions substantially equal to those of the transparent segments or slots 54 in the opaque band 53, and the slot 67 is disposed in register with the slots 54 as the latter are moved through the center line of the dial at the top thereof, thereby directing a beam of light from the lamp to the photo-electric device 61, which is disposed in front of the dial case 46. A glass window 68 is mounted in the dial case 46 and is spaced in front of the dial 45 by an annular spacing band 69, and protects the movable disk 50.

As the specimen 36 elongates during the application of tensile force thereon, the disk 50 rotates the opaque and transparent segments in the band 53 alternately into register with the slot 67, thereby causing the light coming through the slot 67 from the lamp 60 to be alternately interrupted and transmitted to the photo-electric device 61.

The device 61 comprises a case 75 within which is mounted a conventional electronic tube 76 of the photo-electric type, which converts impulses of light to impulses of electric energy, as is known to those skilled in the art. The case 75 is provided with a mounting lug 77, apertured at 78 to receive a supporting rod 79, which is secured rigidly thereto by a set screw 80. The rod 79 extends horizontally through the aperture 78 and has a vertical shank portion which is mounted in a channel shaped bracket 81 fixed to the lower head 22. The rod 79 is slidable vertically in the bracket 81 and is held in vertically adjusted position by a collar 82, secured to the rod 79 by a set screw 83. The rod is rotatable about its vertical axis in the bracket 81 to swing the photo-electric device 61 into and out of operating position in front of the extensometer. The device 61 is adjustable along the horizontal arm of the rod 79 when the set screw 80 is loosened. A two conductor cable 84 connects the device 61 with the indicating unit 16.

The indicating unit 16 includes a pressure indicating hand 90, which is moved angularly about a circular scale 91 within an indicator housing 92. The hand 90 is actuated by suitable hydraulic pressure measuring mechanism, which is not shown nor described herein since it is conventional. A duct 93 connects the pressure measuring mechanism with the lifting cylinder 28. The unit 16 is also provided with a recording device 95, including a case 96 mounted on the side of the indicator housing 92 and contains a recorder drum 97 carried on a shaft 98, which is journaled on a pair of threaded screws 99, 100. The bearing screw 99 is adjustably supported in the inner wall 101 of the casing 96 and the outer bearing screw 100 is adjustably supported in an outwardly extending bracket 102 on the outer side wall.

A recording pen or stylus 105 is mounted on a supporting rod 106, which extends laterally from the indicator housing 92 in front of the recorder drum 97 and is shiftable horizontally in front of the latter. The rod is shifted inwardly toward the housing 92 by the measuring device which actuates the hand 90, to move the pen 105 a distance proportional to the amount of force being exerted upon the specimen.

The drum 97 is rotated an amount proportional to the elongation of the specimen by either of two propelling means, the choice of which depends upon the amount of magnification desired. When the amount of elongation is comparatively large, the drum 97 can be rotated by a cord 107, which is attached to the movable table 25 at 108, passes under a sheave 109 journaled on a bracket 110 fixed to the base 17 of the loading unit 15, and extends upwardly and is trained over a sheave 111 on the drum shaft 98. A weight 112 is fastened to the end of the cord 107. By virtue of the difference between the diameters of the drum 97 and sheave 111, the drum will move upwardly under the pen at a rate of, for example, two and one-half times the rate of upward movement of the table 25. A magnification ratio of 5 can be obtained by placing the cord 107 over a second sheave 113 on the shaft 98, of half the diameter of the sheave 111.

While a ratio of 5 is adequate for some purposes, it is inadequate to record very small elongations, such as in the order of .0001 inch. For the latter, a ratio in the order of 500 can be obtained by the extensometer and photo-electric device 61 which is connected to actuate a ratchet mechanism comprising a peripherally toothed disk 120 attached to the drum 97 at the inner end thereof. A ratchet pawl 121 is engageable with the teeth of the disk 120 and is fixed to a generally vertically disposed link 122, which is pivoted at 123 at its lower end to the armature 124 of a solenoid device 125. The armature 124 is in the form of an arm of paramagnetic material, such as iron, pivoted at 126 on a vertical leg 127 of the solenoid core, which has a horizontal leg 128 attached thereto by a screw or bolt 129. A second vertical leg 130 is attached to the leg 128 by a bolt 131 and is encircled by a solenoid coil 132. The horizontal leg 128 of the solenoid coil is supported on a pair of resilient cushion members 141, secured by bolts 142 to a plate 143, which is mounted on supports 144 fixed to a bracket 144' attached to the wall 101 of the case.

The link 122 and armature 124 are held in raised position by a coil spring 133 connected to the link and anchored to a post 134 mounted on the wall 101 of the recorder case 96. When the coil 132 is energized, the armature 124 and link 122 are pulled downwardly, thereby moving the drum 97 in a counterclockwise direction as viewed in Figure 8. The spring 133 retracts the link upwardly when the coil is deenergized, the pawl 121 slipping over the toothed disk 120.

The upper end of the link 122 is guided between a cylindrical rear guide 135 and a front roller 136. The guide 135 is mounted eccentrically on a bolt 137 supported in a block 138 fixed to the wall 101. The roller 136 is journaled on a screw 139 on a pivoted lever 140. The lever is pivoted at 145 on the block 138 for vertical angular movement between three positions and is retained in adjusted position by a spring detent 146 having a latch 147 which extends through an aperture in the lever 140 and yieldably engages any of three recesses 148 in the block 138. The lever 140 has a handle 149 extending forwardly through a slot 150 in the front wall 151 of the case 96. An upper cylindrical stop 152 is mounted eccentrically on a bolt 153, secured to the block 138, and engages the upper end of the link 122, which is beveled at 154, and serves to limit the upward movement of the link.

Figures 8, 9, 10:
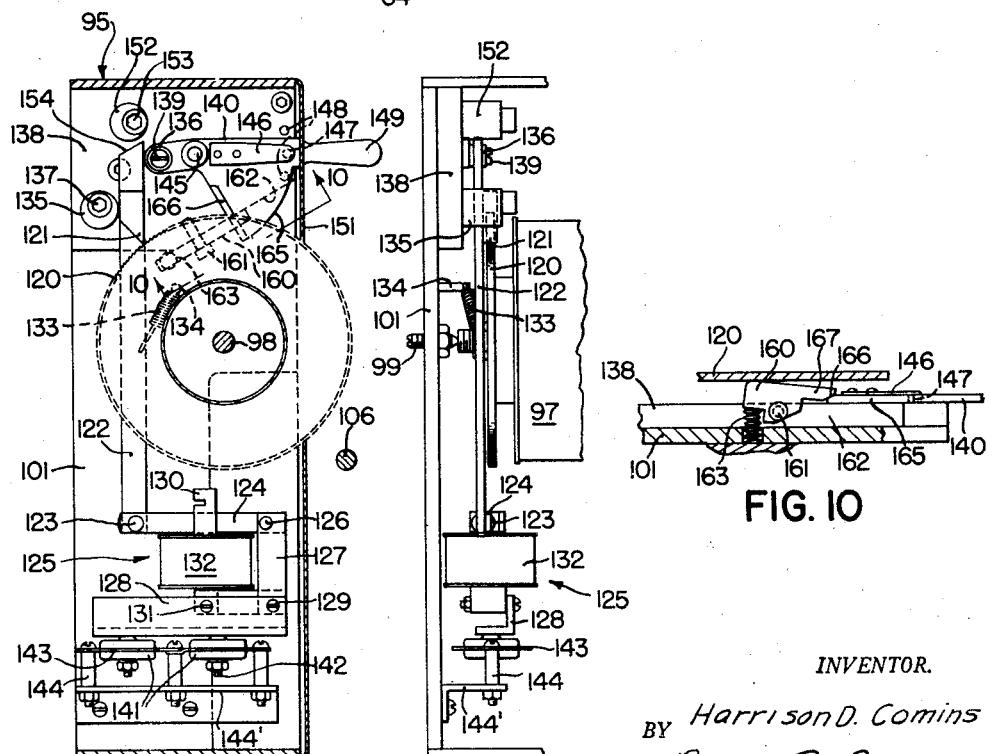
Figure 8 is an enlarged sectional view of the recorder taken along a line 8—8 in Figure 7 and showing the solenoid and ratchet drive mechanism.
Figure 9 is a rear view of the ratchet drive mechanism.
Figure 10 is a fragmentary view of the brake mechanism taken along a line 10—10 in Figure 8.

The link 122 and armature 124 are shown in Figure 8 in their lowered position as when the coil 132 is energized and the lever 140 is shown in its intermediate position, corresponding to the lower of two magnification rates under control of the photoelectric device, such as, for example, 250 times the rate of elongation of the specimen. When the link is retracted upwardly by the spring 133, the pawl 121 moves up one tooth on the disk 120 before the beveled end 154 engages the stop 152. Thus each reciprocation of the link 122 advances the disk, and hence the drum 97, the distance between two adjacent teeth on the ratchet disk 120. However, by moving the handle 149 of the lever 140 upwardly to the top position, the roller 136 is swung down and forwardly, permitting the link 122 to be raised slightly forwardly to move the pawl 121 over two ratchet teeth on the disk 120, thereby moving the drum the distance of two teeth on the ratchet disk, for a magnification of 500. Other magnification rates can be obtained by loosening the bolts, 137, 153, and adjusting the eccentric guide 135 and stop 152.

To restrain the drum against coasting during control by the ratchet mechanism, a light brake is applied. The brake is best shown in Figure 10 and comprises a shoe 160, pivotally mounted at 161 on the bottom inclined edge 162 of the block 138. A compression spring 163 bears against the shoe to hold it in frictional contact with the side of the ratchet disk 120. The brake shoe prevents the drum from moving backwards when the pawl 121 slips upwardly over the teeth of the disk 120, but yields to the stronger force of the solenoid when the link is pulled downwardly.

However, when the drum is being rotated by the cord 107 during a low magnification test, the drum must turn easily, without friction, therefore provision is made for holding the brake released, comprising a plate 165 depending from the lever 140 and having a beveled edge 166 adapted to engage beneath an arm 167 on the brake shoe and wedge the latter away from the disk 120. This wedging action is obtained by moving the lever down to its lowest position.

Figure 7:
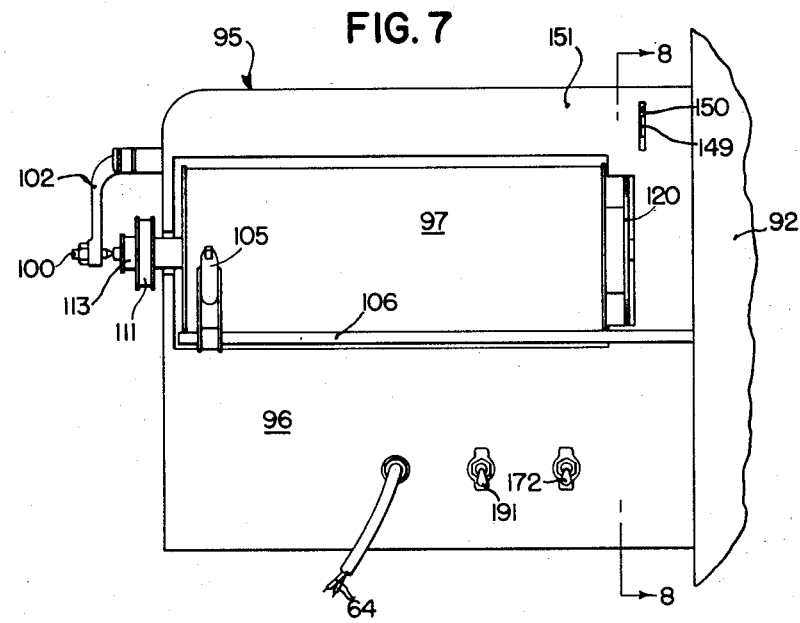
Figure 7 is a front elevational view of the recorder.

Referring now to Figure 11, power is obtained from a circuit 170, preferably at 110 volts A. C. through a switch 171, operated by a toggle lever 172 (Figure 7) on the front of the recorder case 96. A pair of conductors 173 connect the switch 171 to the primary of a transformer 174. A second transformer 175 is connected between the conductors 173 and furnishes energy to the miniature lamp 60 through the wires 64. A variable resistor 176 is connected in series with the lamp 60 for adjusting the current supplied thereto, and one pole of a double pole switch 177 is also connected in series with the lamp for disconnecting the latter.

The transformer 174 is provided with three secondary windings 178, 179, 180. One winding 178 is connected to the wires 84 leading to the photo-electric tube 76 in series with a condenser 181. A triode amplifier tube 182 has its filament connected across the secondary winding 179 and its grid is connected through a resistor 183 to one of the wires 84 between cathode of the tube 76 and the condenser 181. The plate of the triode tube 182 is connected by a wire 184 to the coil 185 of a relay 186. The other end of the coil is connected by a wire 193 to the third secondary winding 180 of the transformer 174. The other end of winding 180 is connected by a wire 187 to the midpoint of the secondary winding 179 and to the movable contact of a potentiometer 188, which is connected across the secondary winding 178. A condenser 189 is connected across the relay coil 185 to smooth out pulsations and prevent chattering of the relay 186. The latter is normally open and is connected in series with the solenoid coil 132 through the other pole of the switch 177, and a wire 190 to energize the solenoid 132 from the conductors 173 when the relay 186 is closed. The switch 177 is actuated by a toggle 191 to disconnect the lamp 60 and also the relay 186 from the solenoid coil 132. The solenoid coil 132 can be energized by a manually operated push button 192 when desired, which connects the coil 132 directly across the line 173.

The operation of the above described embodiment of the present invention is as follows: The specimen 36 is marked with two points at the proper distance apart and the extensometer is connected thereto at said points. The photo-electric device is then positioned in front of the extensometer dial and the switches 171, 177 are closed. The pumping mechanism is started, thereby forcing fluid into the cylinder 28 at a rate controlled by the controller 34. The pressure in the cylinder begins to rise, causing the pen 105 to be moved toward the right on the drum 97, on which a chart has been suitably attached with the starting point for the pen in the lower left hand corner of the chart.

Elongation of the specimen begins to take place, causing the extensometer disk 50 to begin to move in a clockwise direction. As each transparent segment 54 moves into register with the slot 67, a beam of light is transmitted through to the photo-electric cell 76, causing a sudden rise of current flow in the circuit 84, which changes the potential on the grid of the amplifier tube 182, which permits an amplified current to flow to the relay coil 185, closing the relay 186 and thereby energizing the solenoid coil 132, reciprocating the ratchet link 122 and rotating the drum. Then as the extensometer disk moves the transparent segment 54 out of register with the slot 67, the light is interrupted by the opaque segment of the band 53, thereby deenergizing the relay coil 185 and hence, the solenoid coil 132, permitting the spring 133 to retract the ratchet link 122.

Figure 12:
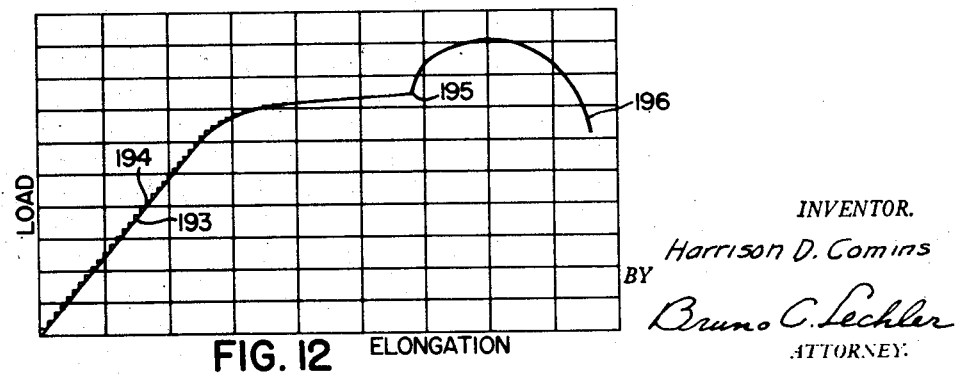
Figure 12 is a graph showing a typical curve recorded during a test.

A conventional extensometer is adapted to rotate the indicator through one revolution for an elongation of the specimen of .02 inch. When the customary 2 inch specimen length is used this is equivalent to one revolution for an elongation of .010″ per inch of specimen. If the disk 50 is provided with 100 transparent segments spaced peripherally thereon, each segment represents an elongation of .0001 inch per inch of specimen. Figure 12 shows a typical stress-strain diagram recorded by the solenoid recording mechanism. Since the true elongation is recorded at the instant of energization of the solenoid coil 132, the true stress-strain diagram is a smooth line 193 drawn through the lower corners of the stepped line 194 drawn by the pen 105. This true diagram 193 is a straight line until the yield point of the specimen is reached, after which the elongation takes place at a much greater rate in proportion to the increase in pressure until the ultimate fracture is reached.

After reaching the yield point, it is advisable to switch over to a low magnification by opening the switch 177 and removing the extensometer from the specimen, and placing the cord 107 in operating position. This cord can, however, be in operating position during the first part of the test, as it has no appreciable interference with the operation of the drum by the ratchet mechanism. The brake must be released from the drum when changing to the low magnification, by depressing the handle 149 to its lowest position. The point on the diagram at which the change-over is made is indicated at 195. From here to the breaking point 196, the elongation is great enough to appear on the chart by the use of the low magnification. Obviously, the direct connection between the movable table 25 and the drum 97 through the cord 107 causes a smooth curve to be drawn on the chart.

The recorder may also be operated manually on high magnification. The photo-electric device can be swung away from the extensometer or eliminated entirely, using only the ratchet device actuated by the push button 192. The observer watches the pointer 52 move as the specimen elongates. Each time the pointer moves one graduation, the operator pushes the button 192, which will cause the solenoid 132 to attract its armature, moving the drum. Thus it will be seen that a similar type of graph as shown in Figure 12 will result. As before, the pen 105 is moved by rod 106 to record the load applied, while the rotary movement of the drum is accomplished by the observer operating the push button 192.

Thus, it will be understood that the apparatus can be furnished with only the ratchet mechanism and push button, or with the entire combination shown in Figure 1, in which case the photo-electric device can be disconnected by opening the switch 177 by its lever 191. This manual method, using the push button, can be used with any conventional extensometer, compressometer or transverse indicator, which is not equipped with light and slotted disk for automatic operation.

It is not intended to limit the invention to the particular details disclosed herein, for widely different means may be employed in the practice of this invention without departing from the scope thereof, limited only by the claims which follow.

I claim:

1. In a machine for determining the stress-strain characteristics of materials, the combination of an extensometer adapted to be connected to a test specimen at predetermined spaced points and comprising a pair of relatively movable elements having alternate light transmitting and light interrupting portions adapted to move into and out of register during relative movement of said elements as said specimen is distorted, a source of light disposed on one side of said pair of elements, a device disposed on the opposite side of said elements to receive an intermittently interrupted beam of light through said light transmitting portions for establishing electrical impulses responsive to said interruptions, electro-mechanical means connected with said device and actuable by said electrical impulses, a recording chart, and means to advance said chart one step in response to each actuation of the electro-mechanical means.

2. In a machine for determining the stress-strain characteristics of materials, the combination of an extensometer adapted to be connected to a test specimen at predetermined spaced points and having a movable element and a screen mounted on said element and movable therewith, said screen having a series of uniformly spaced, alternately disposed, light transmitting and interrupting portions, a source of light providing a beam directed at said screen and positioned to be alternately intercepted and transmitted thereby as said screen moves with said element, a photo-electric device positioned to receive the impulses of light transmitted by said transmitting portions of said screen and convert the same to electric impulses, and a recorder including a rotatable drum and a step by step mechanism having electro-mechanical propelling means responsive to the electric impulses for rotating said drum.

3. In a machine for determining the stress-strain characteristics of materials, the combination of an extensometer adapted to be connected to a test specimen at predetermined spaced points and having a movable element and a screen mounted on said element and movable therewith, said screen having a series of uniformly spaced, alternately disposed, light transmitting and interrupting portions, a source of light providing a beam directed at said screen and positioned to be alternately intercepted and transmitted thereby as said screen moves with said element, a photo-electric device positioned to receive the impulses of light transmitted by said transmitting portions of said screen and convert the same to electric impulses, and a recorder including a rotatable drum, a solenoid responsive to said impulses, and a ratchet mechanism actuated by the solenoid for rotatably advancing said drum in equal increments.

4. The combination set forth in claim 3, including the further provision of means for adjusting the extent of each increment of movement of said drum to adjust the scale of the stress-strain curve recorded on said drum.

5. In a machine for determining the stress-strain characteristics of materials, the combination of an extensometer adapted to be connected to a test specimen at predetermined spaced points and having a rotatable indicating element, a dial mounted of said element for rotation therewith and having a series of circumferentially spaced, alternately disposed, light transmitting and interrupting sectorial portions, a source of light providing a beam directed at said dial and positioned to be alternately intercepted and transmitted thereby as said dial rotates, a photo-electric device positioned to receive the impulses of light transmitted by said transmitting portions of said dial and convert the same to electric impulses, a solenoid coil connected with said device to be energized by said electric impulses, and recording means comprising a rotatable drum, a reciprocative ratchet member engageable with said drum for rotating the latter in equal increments actuated by said solenoid coil when the latter is energized and having a spring for returning said reciprocative member between impulses.

6. The combination set forth in claim 5, including the further provision of adjustable guide means for said ratchet member, said guide means being adjustable to shift said ratchet member toward and away from said drum for adjustably predetermining the extent of each of said equal increments of movement of said drum with each reciprocation of said ratchet member.

7. In a machine for determining the stress-strain characteristics of materials, the combination of an extensometer adapted to be connected to a test specimen at predetermined spaced points, said extensometer including means for emitting a flash of light for each predetermined increment of elongation of said test specimen between said points, a photo-electric device positioned to receive the flashes of light, and remotely disposed means controlled by said photo-electric device for indicating the total amount of elongation between said points.

8. In a machine for determining the stress-strain characteristics of materials, the combination of an extensometer adapted to be connected to a test specimen at predetermined spaced points, said extensometer including means for emitting a flash of light for each predetermined increment of elongation of said test specimen between said points, a photo-electric device positioned to receive the flashes of light, a recording device having a movable element, and means controlled by said photo-electric device for moving said element a predetermined amount for each increment of elongation between said points on the test specimen.

9. In a machine for determining the stress-strain characteristics of materials, the combination of an extensometer adapted to be connected to a test specimen at predetermined spaced points, said extensometer including means for emitting a flash of light for each predetermined increment of elongation of said test specimen between said points, a photo-electric device positioned to receive the flashes of light, a recording device comprising a rotatable drum element and a marking element shiftable axially along said drum element to record a curve on the latter, means responsive to the amount of force exerted on said specimen for moving one of said elements, and means controlled by said photo-electric device for moving the other of said elements.

10. Apparatus for graphically recording simultaneous values of two varying quantities comprising, in combination, an instrument having an element movable in proportion to the changing values of the first quantity, a screen having a series of alternately spaced transparent and opaque sections movable with said element, a source of light projecting a beam through a stationary aperture and the transparent sections of said screen as they pass the aperture to secure a number of light impulses numerically proportionate to the change of said first quantity, a rotatable recording drum, means adapted to rotate said drum one step, means responsive to each light impulse causing said first-named means to move the drum one step, a non-rotating scribing stylus, means adapted to move the stylus along the cylindrical element of said drum a distance proportionate to changes in the value of the second of said quantities.

11. Apparatus for graphically recording simultaneous values of two varying quantities comprising, in combination, an instrument having an element movable in proportion to the changing values of the first quantity, a screen having a series of alternating uniformly spaced transparent and opaque sections movable with said element, a source of light projecting a beam through a stationary aperture and the transparent sections of said screen as they pass the aperature, a photocell upon which the beam falls as each transparent section passes through the beam to create a number of electrical impulses numerically proportionate to the change of said quantity, a rotatable recording drum, a solenoid responsive to each of said electrical impulses adapted to rotate said drum one step for each electrical impulse, an instrument for measuring the second variable quantity, a stylus adapted to be moved parallel to the axis of the cylinder along the surface of said drum a distance proportionate to the change in the value of said second quantity.

12. In a machine for determining the strain characteristics of materials, an extensometer adapted to be attached to a specimen at spaced apart points, means for applying stress to the specimen, two relatively adjacent elements movable respectively with said points of attachment to the specimen, an opening in one of said elements, a plurality of spaced openings in the other element, a light source disposed on one side of said elements projecting a beam of light each time that openings in both elements come into alignment, a light responsive valve in an electric circuit transmitting current whenever said light beam passing through both elements strikes the valve, a recorder support stepping means responsive to each of said electric impulses, a record chart moved forward a fixed amount relative to said recorder support each time the current flows through said stepping means, a stylus supported on said recorder support.

13. In a machine for determining the strain characteristics of materials, in combination, means for holding one part of a specimen, means for applying stress to another part of a specimen, an extensometer adapted to be connected to said test specimen at points spaced apart a predetermined distance, a screen carried by the extensometer and movable in response to the elongation of the specimen, alternate opaque and light-transmitting sections in said screen, a source of light throwing a beam which is intercepted by the passage of the opaque portions of said screen, a photoelectric element positioned on the side of the screen opposite to the source of light and adapted to break a current whenever an opaque portion of the screen cuts the beam, a remotely located chart and stylus, an electro-mechanism responding to said current to move the chart and stylus one step relative to each other each time an opaque part of the screen interrupts the beam.

14. Means for plotting a stress-strain record of a specimen to a normal scale and with any desired portion of the curve enlarged comprising, in combination, a specimen held in a fixed position at one end, a clamp attached to the other end of the specimen, means for moving the clamp to apply stress to the specimen, a movable drum carrying a blank record chart, frictional drum driving means actuated by the movement of said clamp, means for measuring the stress applied to the clamp, a scriber movable along the chart parallel to the drum axis, means responsive to the load applied to the specimen to move the scriber a distance proportional to the load applied to the specimen, an extensometer attached to the specimen, means for projecting a flash of light for each increment of extension indicated by the extensometer, a photo cell cell responsive to said flashes controlling an electric circuit to pass an electric current for each flash, a positive electro-mechanical drive for moving the drum one step for each flash, a load increase sufficient to create a flash causing a greater drum movement through the positive drive than through the frictional drive governed by the movement of the clamp and causing said frictional drive of the drum to slip, means for optionally making the electro-mechanical drive effective or ineffective.

15. Means for plotting a stress-strain record of a specimen to a normal scale and with any desired portion of the curve enlarged comprising, in combination, a specimen held in a fixed position at one end, a clamp attached to the other end of the specimen, means for moving the clamp to apply stress, a movable drum carrying a blank record chart, frictional drum driving means actuated by the movement of said clamp, means for measuring the stress applied to the clamp, a scriber moved along the chart parallel to the drum axis, means responsive to the load applied to the specimen to move the scriber a distance proportional to the load applied to the specimen, an extensometer attached to the specimen, means for projecting a flash of light for each increment of extension indicated by the extensometer, a photocell responsive to said flashes controlling an electric circuit to pass an electric current for each flash, a positive electro-mechanical drive for moving the drum one step for each flash, said step representing a greater drum movement than that of the frictional drive, a braking member for the end head of the drum to prevent the drum from moving when not being stepped along, a spring holding said braking member in action, a lever movable in a plane parallel to the end head of the drum adapted to hold said brake disengaged to permit the frictional drum drive means to function, means for optionally making the electro-mechanical drive effective or ineffective.

HARRISON D. COMINS.

REFERENCES CITED

The following references are of record in the file of this patent:

UNITED STATES PATENTS

| Number | Name | Date |
| --- | --- | --- |
| 1,816,047 | Keuffel | July 28, 1931 |
| 1,894,132 | Stone | Jan. 10, 1933 |
| 1,934,400 | Bollman | Nov. 7, 1933 |
| 2,046,005 | Sprecker | June 30, 1936 |
| 2,061,383 | Lewis | Nov. 17, 1936 |
| 2,091,535 | Templin | Aug. 31, 1937 |
| 2,198,040 | Peters | Apr. 23, 1940 |
| 2,303,621 | Donnelly | Dec. 1, 1942 |
| 2,351,081 | Swift | June 13, 1944 |
| 2,376,459 | Stevens | May 22, 1945 |
| 2,388,105 | Wilson | Oct. 30, 1945 |
| 2,398,046 | Schaefer | Apr. 9, 1946 |

FOREIGN PATENTS

| Number | Country | Date |
| --- | --- | --- |
| 426,144 | Great Britain | Mar. 28, 1935 |
| 460,997 | Great Britain | Feb. 8, 1937 |